United States Patent [19]

Schwochow et al.

[11] 3,720,756

[45] March 13, 1973

[54] PRODUCTION OF SYNTHETIC ZEOLITES OF FAUJASITE STRUCTURE

[75] Inventors: Friedrich Schwochow, Leverkusen; Gerhard Heinze, Schildgen, both of Germany

[73] Assignee: Farbenfabriken Bayer Aktiengellschaft, Leverkusen, Germany

[22] Filed: Jan. 5, 1971

[21] Appl. No.: 104,178

[30] Foreign Application Priority Data

Jan. 22, 1970 Germany.................P 20 02 626.0

[52] U.S. Cl..................................423/329
[51] Int. Cl................................C01b 33/28
[58] Field of Search.....23/113, 111, 112; 252/455 Z; 423/329

[56] References Cited

UNITED STATES PATENTS

| | | | |
|---|---|---|---|
| 2,904,607 | 9/1959 | Mattox et al. | 260/671 |
| 3,058,805 | 10/1962 | Weber | 23/113 |
| 2,882,244 | 4/1959 | Milton | 23/113 |
| 3,055,841 | 9/1962 | Gladrow et al. | 252/455 Z |

FOREIGN PATENTS OR APPLICATIONS 1,171,463   11/1969   Great Britain..........................23/113

*Primary Examiner*—Edward J. Meros
*Attorney*—Burgess, Dinklage & Sprung

[57] ABSTRACT

A gel containing $Na_2O$, $Al_2O_3$, $SiO_2$ and $H_2O$ in the approximate molar ratios:

$$SiO_2 : Al_2O_3 = 3.5-5$$

$$Na_2 : SiO_2 = 2-3$$

$$H_2O : Na_2O = 35-45$$

is subjected to hydrothermal crystallization at about 60° to 120° C. The gel is formed by combining an aluminate solution and a sodium silicate solution in suitable proportions, the sodium silicate solution having an $Na_2O:SiO_2$ mole ratio of at least 1.5:1 and an $H_2O:Na_2O$ mole ratio of about 35–45:1. By holding the sodium silicate for at least 15 minutes, preferably about 1 to 4 hours at about 10° to 40° C., the gel subsequently produced may be stirred during crystallization and the crystals will nonetheless have the faujasite structure and the approximate composition $Na_2O \cdot Al_2O_3 \cdot (2-2.5) SiO_2 \cdot (0-8) H_2O$.

4 Claims, No Drawings

PRODUCTION OF SYNTHETIC ZEOLITES OF FAUJASITE STRUCTURE

This invention relates to an improved process for the production of synthetic zeolites of faujasite structure. In general, zeolites are understood to be a group of crystalline, hydrated aluminosilicates of monovalent or polyvalent bases which are able to give off their water without any changes in the crystal structure and absorb other compounds in place of the water removed, and which are also capable of cation exchange (M.H.Hey, Trans.Ceram.Soc. 36 [1937] 84 – 97).

The zeolites obtained by the process according to the invention show the crystal structure of faujasite, a fairly rare mineral which was described for the first time by Damour (Ann.d.mines [1842] 395). A detailed structural analysis can be found in Bergerhoff et al (Min. Monatsk.1958, 193).

With pore diameters of from 8 to 10 A, synthetic faujasites belong to the class of wide-pored molecular sieves. The increasing need for wide-pored zeolites of this kind, mainly in the catalyst field, has resulted in the development over recent years of a number of techniques for synthesizing faujasite. Synthetic faujasites are known in the literature by such names as Z 14 Na, Z 14 HS, Zeolite X, Zeolite Y, Zeolite 13 X, Zeolite 10 X and the like. Differences between the individual types of synthetic faujasite are based primarily upon the $SiO_2:Al_2O_3$ ratio.

The cubic faujasite structure enables this ratio to be varied within very wide limits, (within the limits of 2 to 6) with a corresponding change in the lattice constant $a_o$ from 25.0 to 24.6 A without any fundamental changes occuring in the crystal structure. The molar $SiO_2$ content, based on 1 mol of $Al_2O_3$, is used in the following to characterize the synthetic faujasites, so that a synthetic faujasite with an $SiO_2:Al_2O_3$ ratio of 3 is termed faujasite-3. Even in the case of natural faujasite, the $SiO_2:Al_2O_3$ ratio does not represent a constant value, and, in fact, considerable differences in this ratio are found in minerals mined from different deposits.

In general, the synthetic faujasites are initially prepared in the Na form. Corresponding to their nature as cation exchangers, however, a variety of different cations can be introduced in varying quantities both in natural faujasite and in synthetic faujasite.

In conventional processes for the production of synthetic faujasites, aqueous sodium aluminate and sodium silicate solutions are usually combined with one another and the sodium aluminosilicate gel formed is subsequently subjected to hydrothermal crystallization. However, due to the plurality of zeolites which can be crystallized in the $Na_2O—Al_2O_3—SiO_2—H_2O$ system, in order to obtain pure faujasite, it is necessary to operate under very definite conditions, in which connection the type of $SiO_2$ used, the quantitative ratios between all the starting components used, the temperature and the reaction time represent critical parameters. It has been found that the way in which the reaction is agitated is also a factor of considerable influence, i.e. whether or not the reaction mixture is stirred during precipitation of the gel, during heating to crystallization temperature and finally during crystallization itself. Pure faujasites are only obtained in cases where the reaction mixture is not agitated in any way at least during heating and crystallization. This is because stirring, and especially rapid stirring, promotes the formation of an undesirable secondary product, known as Phillipsite and for which no use has been found, to such an extent that mixtures containing large quantities of Phillipsite are formed as the reaction product.

However, in the large scale production of faujasite as against the production of small quantities on a laboratory scale, the omission of stirring is a disadvantage because, in view of increasing apparatus dimensions, considerable difficulties are involved in heating the reaction mixtures due to the inadequate transfer of heat from the relatively small heat-exchange surface to the stationary suspension. Accordingly, special processes for synthesizing faujasite on an industrial scale have already been developed in which the reaction mixtures prepared in known manner can be heated with stirring to the crystallization temperature. According to German Pat. specification No. 1,138,383 which relates to the production of faujasites—(2.5 ± 0.5) (zeolite X), the reaction mixture is subjected before crystallization to a ripening or ageing process for periods of from 2 hours up to 9 days at temperatures of from 13° to 38° C with a view to reducing gel sensitivity to agitation. Even in the production of faujasites—(4.5 ± 0.5) (zeolite Y) with their greater $SiO_2$ content, much purer products are obtained according to German Pat. specification No. 1,164,384 by subjecting the synthesis mixture to ageing before it has crystallized.

German Pat. specification No. 1,269,111 relates to a process in which the disadvantage of the time-consuming ageing process is obviated by using a specific reactive sodium metasilicate, namely $Na_2O\cdot SiO_2\cdot 5H_2O$, as the silica source for precipitating the sodium aluminosilicate gels. However, this process can only be carried out with the aforementioned highly reactive silicate and suprisingly does not give satisfactory reaction products either with anhydrous sodium metasilicate or with sodium metasilicate-9-hydrate. Neither is it possible under otherwise the same reaction conditions to carry out the process with the commercially preferable $SiO_2$—richer sodium silicates, the so-called water glasses, with the result that the process is limited to the aforementioned relatively uneconomic $Na_2O\cdot SiO_2 \cdot 5H_2O$.

The present invention relates to a process for the production of synthetic zeolites with the crystal structure of faujasite.

It is accordingly an object of the invention to produce synthetic zeolites with the crystal structure of faujasite by a simple process which can be carried out on a large scale, with agitation, and using readily available, inexpensive starting materials.

This and other objects and advantages are realized in accordance with the present invention wherein a gel containing $Na_2O, Al_2O_3, SiO_2$ and $H_2O$ in the approximate molar ratios:

$$SiO_2:Al_2O_3 = 3.5–5$$

$$Na_2O:SiO_2 = 2–3$$

$$H_2O:Na_2O = 35–45$$

is subjected to hydrothermal crystallization at about 60° to 120° C. The gel is formed by combining an aluminate solution and a sodium silicate solution in suitable proportions, the sodium silicate solution having an $Na_2O:SiO_2$ mole ration of at least about 1.5:1 and an $H_2O:Na_2O$ mole ratio of about 35–45:1. By holding the sodium silicate solution for at least 15 minutes, preferably about 1 to 4 hours at about 10° to 40° C., the gel subsequently produced may be stirred during crystallization and the crystals will nonetheless have the faujasite structure and the approximate composition:

$$Na_2O \cdot Al_2O_3 \cdot (2-2.5)SiO_2 \cdot (0-8)H_2O.$$

The process according to the invention obviates the disadvantages of conventional processes, as discussed in the foregoing, and enables synthetic faujasites to be produced on an industrial scale without any need for the sodium alumino-silicate gel to be subjected to a time-consuming ageing process. In cases where economic silicate sources such as for example commercial waterglasses are used, it enables faujasites to be crystallized with continuous stirring, in addition to which the reaction mixtures can be heated immediately after preparation to the most favorable temperature for crystallization without any appreciable quantities of undesirable secondary products being formed. It has suprisingly been found that the composition of the sodium silicate solution used to precipitate the sodium aluminosilicate gels results later on during the crystallization of the gels in either faujasite or Phillipsite.

In the process according to the invention, sodium hydroxide solution or water is added to the silicate solution before the sodium aluminosilicate gels are precipitated so that an $Na_2O:SiO_2$ mol ratio of at least about 1.5 up to about 5, preferably from about 2–3; and an $H_2O:Na_2O$ mol ratio of about 35–45 are obtained. A variety of silicate solutions may be used as the $SiO_2$ sources, so that the process is not limited to any (special) one starting material. For example, it is possible to use silica gels dissolved in sodium hydroxide or wet-precipitated silicas, so-called silica fillers. By virtue of their ready availability, however, it is preferred to use the $SiO_2$—rich sodium silicates of the general formula $Na_2O \cdot 2-4SiO_2$, so-called commercial waterglasses, in the form of aqueous solutions.

Table 1 illustrates the effectiveness of the process according to the invention with reference to the example of commercial waterglass. To this end, waterglass (with a density of 1.33 and a composition of 1.7 mols of $Na_2O$ + 5.78 mols of $SiO_2$ per liter) was adjusted before gel precipitation to the mentioned $Na_2O:SiO_2$ and $H_2O:Na_2O$ ratios with different quantities of sodium hydroxide and water. Sodium aluminate solution (2 mols of $Al_2O_3$ per liter with $Na_2O:Al_2O_3$ = 1.7 and $H_2O:Na_2O$ = 40) was added to the prepared silicate solutions in such a quantity that the total ratio of $SiO_2:Al_2O_3$ of 5 was obtained in the reaction mixture formed: After gel precipitation the mixtures were immediately heated while stirring to 100° C and hydrothermally crystallized for 6 hours at this temperature without any removal of water.

TABLE 1

Influence of the $Na_2O:SiO_2$ ratio in the silicate solution upon the composition of the reaction products:

| Waterglass adjustment (1 hour at 20°C) | | Reaction products | |
|---|---|---|---|
| $Na_2O/$ | $H_2O/$ | $H_2O$-adsorption | composition as |
| $SiO_2$ | $Na_2O$ | capacity* | determined by X-ray analysis |
| 0.66 | 40 | 8.6 | Phillipsite |
| 1.16 | 40 | 8.9 | Phillipsite |
| 1.66 | 40 | 20.3 | faujasite containing 30% of Phillipsite |
| 2.00 | 40 | 27.2 | faujasite containing 5% of Phillipsite |

* in g/100 g at 20°C/10 mm Hg partial pressure of water.

As can be seen from the tests, it is sufficient in order to synthesize faujasite on a commercial scale to adjust the waterglass with sodium hydroxide to a molar ratio of $Na_2O:SiO_2 = 2:1$ when $H_2O:Na_2O = 40:1$.

The time required to pre-treat the waterglass is apparent from the tests discussed in Table II. In this case, commercial water glass was adjusted with sodium hydroxide and water to an $Na_2O:SiO_2$ ratio of 2:1 and to an $H_2O:Na_2O$ ratio of 40:1 before gel precipitation, preheated for different periods at 20° C, gel with the composition:

$$8.75 Na_2O \cdot Al_2O_3 \cdot 3.5\ SiO_2 \cdot 350\ H_2O$$

was subsequently precipitated with aluminate solution, and crystallized hydrothermally with stirring for 2 hours at 100° C.

TABLE 2

Influence of the pretreatment time upon the properties of the reaction product.

| Pretreatment time | $H_2O$ adsorption capacity of the reaction products (20°C, 10 mmHg) |
|---|---|
| 15 minutes | 13.9 g/100 g |
| 2 hours | 28.9 g/100 g |
| 16 hours | 29.9 g/100 g |

As a test of the quality of the reaction products, it is sufficient within the scope of the tests in question to determine the $H_2O$ adsorption capacity because only faujasite or mixtures of faujasite and Phillipsite are expected. Whilst pure Phillipsite adsorbs only about 8 g of water per 100 g at 20° C/10 mm Hg partial pressure of water, pure faujasite adsorbs approximately 30 g of $H_2O$ per 100 g under identical conditions.

As the $H_2O$ adsorption capacities of the preparations set out in Table 2 show, the value required for pure faujasite of 30 g/100 g is approximately obtained after a pretreatment time of only 2 hours, whilst only about half the adsorption values are obtained after 15 minutes. In general, however, the pretreatment time required is governed by the type of silica source used. Thus, considerably shorter or even longer times are required in other cases. However, the most suitable pretreatment time can readily be determined by a preliminary test within the limits of 15 minutes to 24 hours. In general, times of from about 1 to 4 hours are completely sufficient. In most cases, optimum results were obtained with periods of from about 2 to 3 hours.

Table 3 shows the effectiveness of the process according to the invention in cases where other $SiO_2$ sources are used. In one instance, a narrow-pored silica gel (ground, 18.6% $H_2O$, manufactured by Gebr. Herrmann, Koln-Ehrenfeld), whilst in another instance a wet-precipitated silica filler (90% $SiO_2$) with a specific surface in the $SiO_2$ particles of 180 m²/g (determined according to BET,J.Am.Chem.Soc. 1938,60, 309), was used as the starting material.

The two amorphous silicas were dissolved in sodium hydroxide at 20°C, with the aforementioned $Na_2O:SiO_2$ and $H_2O:Na_2O$ ratios, and pretreated for 16 hours. Gel precipitation ($SiO_2:Al_2O_3 = 5$ in the total mixture) was then carried out with the same aluminate solution as in the tests discussed in Table 1. Crystallization was carried out with continuous stirring at a temperature of 100° C.

TABLE 3

Adjustment conditions for different $SiO_2$ sources

| Preparation of the silicate solution | | | crystallization time at 100°C | $H_2O$ adsorption capacity (20°C, 10 mm Hg) |
|---|---|---|---|---|
| $SiO_2$ source 16 hours at 20°C | $Na_2O/SiO_2$ | $H_2O/Na_2O$ | | |
| Silica gel | 1.66 | 40 | 4 hours | 14.5 g/100 g |
| silica gel | 2.00 | 40 | 4 hours | 28.3 g/100 g |
| $SiO_2$ filler | 1.16 | 40 | 6 hours | 13.8 g/100 g |
| $SiO_2$ filler | 1.66 | 40 | 6 hours | 29.1 g/100 g |

This comparison shows that an $Na_2O:SiO_2$ ratio of at least 2.0:1 during the pretreatment stage is sufficient to yield pure faujasite from both $SiO_2$ sources. At the same time, it can be seen that it is not possible to quote any exact limit to the minimum requirement for the $Na_2O:SiO_2$ ratio required for depolymerization because more or less large quantities of sodium hydroxide may be needed for depolymerization depending upon the type of $SiO_2$ used. Nevertheless, the tests referred to clearly show that, even with powdered reactive $SiO_2$ sources such as silica filler, an $Na_2O:SiO_2$ ratio of at least about 1.5:1 to be established for pretreatment of the silicate solution.

In addition to the advantage that it can be carried out in the absence of a gel-ageing stage even with basically inactive silicates, the process according to the invention has the additional advantage of extremely short crystallization times.

Crystallization times of up to 8 hours are required even for the crystallization of aged aluminosilicate gels in accordance with German Pat. specification No. 1,138,383, whilst, in the process according to the invention 2 hours are usually sufficient for the hydrothermal treatment at 90° to 100° c. Nevertheless, the crystallization period can also be extended beyond this minimum time where synthesis is carried out within the limits specified above without any appreciable influence upon the adsorption capacity of the faujasite zeolites obtained. As the tests discussed in Table 4 show, satisfactory preparations are obtained in a highly reproducible form over periods of from 2 to 8 hours. In the tests, pretreated water glass ($Na_2O: SiO_2 = 2.0:1$; $H_2O: Na_2O = 40:1$) was precipitated with sodium aluminate solution ($SiO_2:Al_2O_3$ molar ratio after precipitation in the mixture = 3.5:1; $Na_2O:SiO_2$ ratio = 2.5:1; $H_2O:Na_2O = 40:1$ ) and crystallized while stirring at 100° C.

TABLE 4

Adsorption capacities of synthetic faujasites after different crystallization times

| crystallization time | $H_2O$-adsorption capacity in g/100 g g/100 g, (20°C/10 mm Hg) | | |
|---|---|---|---|
| | Test runs | | |
| | 1 | 2 | 3 |
| 2 hours | 29.2 | 29.9 | 29.1 |
| 6 hours | 29.6 | 30.2 | 29.0 |
| 8 hours | 29.0 | 29.8 | 29.4 |

The process according to the invention is described in the following Examples.

The following basic solutions were used as starting materials for the tests:

A. commercial waterglass, (1.7 mols of $Na_2O$ + 5.78 mols of $SiO_2$) per liter, density 1.33
B. sodium aluminate solution, (3.4 mols of $Na_2O$ + 2.0 mols of $Al_2O_3$) per liter, density 1.36
C. sodium hydroxide: 45 percent, 8.36 mols of $Na_2O$ per liter density 1.48

EXAMPLE 1

*a.* 120 ml of commercial waterglass (solution A) were adjusted at room temperature with 150 ml of 45 percent sodium hydroxide and 775 ml of $H_2O$ to the molar ratios $Na_2O:SiO_2 = 2.1:1$ and $H_2O:Na_2O = 39:1$, and left standing for 2 hours as pretreatment. Thereafter, a mixture of 100 ml of aluminate solution (solution B) and 150 ml of water was quickly stirred into this silicate solution. The sodium aluminosilica gel formed (overall molar ratios in the mixture $SiO_2:Al_2O_3 = 3.5:1$; $Na_2O:SiO_2 = 2.6:1$ and $H_2O:Na_2O = 39:1$) was heated with continuous stirring for some 30 minutes to a temperature of 100° C and, to promote crystallization, stirring was continued for 2 hours under reflux at this temperature. The crystals formed were separated off from the mother liquor by filtration and washed with distilled water until the water running off had a pH value of from 8 to 9. The dried and activated faujasite zeolite had an $H_2O$ adsorption capacity of 28.9 g/100 g (at 20° C/10 mm Hg) and did not contain any secondary products.

*b.* On this occasion pretreatment was carried out at 40° C under otherwise the same conditions as in Example 1a. To this end, the same quantities of waterglass, sodium hydroxide and water were combined at room temperature and the resulting silicate solution was subsequently heated for 2 hours to 40° C. Gel precipitation with sodium aluminate solution was also carried out at 40° C. In other respects, synthesis was carried out as in Example 1a. Pure faujasite zeolite with an $H_2O$ adsorption capacity of 30.0 g/100 g (at 20° C/10 mm Hg) was obtained.

*c.* This Example shows that even a considerably lengthened pretreatment time does not have any negative influence on the products formed.

As in the two preceding Examples, the waterglass solution with $Na_2O:SiO_2 = 2.1:1$ and $H_2O:Na_2O = 39:1$ was pretreated at 20° C except on this occasion for 16 hours. Gel precipitation and crystallization (with the overall mol ratios: $SiO_2:Al_2O_3 = 3.5:1$, $Na_2:SiO_2 = 2.6:1$ and $H_2O:Na_2O = 39:1$ in the mixture) were carried out as in Example 1 a.

In this case, too, pure faujasite zeolite with an $H_2O$ adsorption capacity of 29.9 g/100 g (at 20° C/10 mm Hg) was obtained.

d. This Example demonstrates the effectiveness of pretreatment with reference to a comparison example.

Immediately after it had been prepared, the same silicates solution as in the preceding Examples, consisting of 120 ml of solution A, 150 ml of solution C and 775 ml of $H_2O$, was precipitated with a mixture of 100 ml of solution B and 150 ml of $H_2O$. The gel formed, with the following general composition: $9\ Na_2O\cdot Al_2O_3\cdot 3,5\ SiO_2\cdot 350\ H_2O$, was heated with stirring to 100° C over a period of 30 minutes and crystallized for 6 hours at this temperature. The reaction product of this test had an $H_2O$ adsorption capacity of only 16.6 g/100 g (at 20° C/10 mm Hg) and consisted of a mixture of substantially equal parts of Phillipsite and faujasite.

EXAMPLE 2

The present test provides an Example of the synthesis of faujasite from commercial waterglass with modified concentration.

For pretreatment purposes, 200 ml of concentrated sodium hydroxide (solution C) and 100 ml of water were added to 175ml of waterglass ($Na_2O:SiO_2 = 1.95:1$; $H_2O:Na_2O = 41:1$) (solution A), and brought into equilibrium over a period of 1 hour at room temperature with repeated stirring. The aluminosilicate gel was then precipitated with stirring from this silicate solution with 100 ml of aluminate (solution B) and 150 ml of $H_2O$ (overall molar ratios in the mixture: $SiO_2:Al_2BG3 \times 5:1$; $Na_2O:SiO_2 = 2.3:1$ and $H_2O:Na_2O = 41:1$). The gel was heated to 100° C immediately after it had been precipitated and crystallized under reflux at this temperature for a period of 6 hours during which it was continuously stirred.

The washed, dried and activated reaction product adsorbed 27.2 g of $H_2O$ per 100 g (at 20° C/10 mm Hg) and in addition to the required faujasite zeolite only contained about 3 percent of Phillipsite as an impurity.

EXAMPLE 3

Wet-precipitated silica filler was used as the $SiO_2$ source in this Example. The filler consisted of amorphous $SiO_2$ (containing 7.5 percent of $H_2O$) with a specific surface in the $SiO_2$ particles of 180 m²/g (according to BET). 65 g of the filler were dissolved while stirring at room temperature in a mixture of 240 ml of sodium hydroxide (solution C) and 1200 ml of $H_2O$, and the resulting freshly prepared silicate solution ($Na_2O:SiO_2 = 2.0:1$:$H_2O:Na_2O = 40:1$), was precipitated with aluminate solution (100 ml of solution B and 150 ml of $H_2O$), and the precipitated gel, with the overall composition: $11.7\ Na_2O\cdot Al_2O_3\cdot 5\ SiO_2\cdot 467\ H_2O$, was heated to 100° C and then hydrothermally reacted at this temperature with continuous stirring over a period of 4 hours. The washed, dried and activated product adsorbed 29.2 g of $H_2O$ per 100 g (20° C/10 mm Hg) and according to X-ray analysis was pure faujasite 2,17 with a lattice constant $a_o = 24.991$ A.

It will be appreciated that the instant specification and examples are set forth by way of illustration and not limitation, and that various modifications and changes may be made without departing from the spirit and scope of the present invention.

What is claimed is:

1. In the production of a synthetic zeolite wherein a sodium silicate solution and an aluminate solution are combined to form a gel containing $Na_2O$, $Al_2O_3$, $SiO_2$ and $H_2O$, and the gel is hydrothermally crystallized, the improvement which comprises adjusting an aqueous solution of sodium silicate having the general formula $Na_2O\cdot(2-4)\ SiO_2$ to an $Na_2O:SiO_2$ mole ratio of at least about 1.5:1 and an $H_2O:Na_2O$ mole ratio of about 35–45:1, and maintaining said solution for at least about 1 hour before combining it with the aluminate solution, the compositions and proportions of the sodium silicate and aluminate solutions being such that the molar ratios in the gel are about:

$$SiO_2:Al_2O_3 = 3.5-5$$

$$Na_2O:SiO_2 = 2-3$$

$$H_2O:Na_2O = 35-45$$

and stirring the gel during hydrothermal crystallization whereby the product which crystallizes has the crystal structure of faujasite and a composition corresponding to the general formula $Na_2O\cdot Al_2O_3\cdot(2-2.5)SiO_2\cdot(0-8)H_2O$.

2. A process according to claim 1, wherein the sodium silicate solution is maintained at about 10° to 40° C. for about 1 to 4 hours after its adjustment and prior to combination with the aluminate solution.

3. A process according to claim 1, wherein hydrothermal crystallization of the gel is carried out substantially immediately after its formation.

4. A process according to claim 2, wherein the hydrothermal crystallization of the gel is carried out substantially immediately after its formation.

* * * * *